United States Patent [19]

Miller

[11] Patent Number: 4,911,015

[45] Date of Patent: Mar. 27, 1990

[54] NON-ELECTRICAL MONITORING OF A PHYSICAL CONDITION

[75] Inventor: Robert C. Miller, Salem Township, Westmoreland County, Pa.

[73] Assignee: Asea Brown Boveri Inc., Purchase, N.Y.

[21] Appl. No.: 270,863

[22] Filed: Nov. 14, 1988

[51] Int. Cl.$^4$ .............................................. G01L 7/06
[52] U.S. Cl. ....................................... 73/705; 73/729; 250/231.19
[58] Field of Search ............... 73/705, 729; 250/231 P

[56] References Cited

U.S. PATENT DOCUMENTS

| 4,368,645 | 1/1983 | Glenn et al. | 73/705 |
| 4,495,819 | 1/1985 | Tekippe | 73/705 |
| 4,515,473 | 5/1985 | Mermelstein | 73/705 |
| 4,612,810 | 9/1986 | Martens | 73/705 |

FOREIGN PATENT DOCUMENTS 0211523 12/1982 Japan ..................... 73/705

Primary Examiner—Donald O. Woodiel
Attorney, Agent, or Firm—B. R. Studebaker

[57] ABSTRACT

A method for monitoring temperature or pressure by the steps of: providing a light path (30–42) having a light attenuating characteristic which is substantially independent of light wavelength, at least with respect to a given wavelength range; conducting light having different first and second wavelengths which are in the given wavelength range along the light path (30–42); controlling the intensity of the radiation along the light path (30–42) as a function of the temperature or pressure to be monitored and the light wavelength; producing (76–82): four signals having values representing the light intensity at, respectively: the output end of the path for light having the first wavelength; the input end of the path for light having the first wavelength; the output end of the path for light having the second wavelength; and the input end of the path for light having the second wavelength; and deriving (86–90) an output signal having a value representing the ratio of the mathematical product of the values of the first and fourth signals to the mathematical product of the values of the second and third signals.

13 Claims, 2 Drawing Sheets

NON-ELECTRICAL MONITORING OF A PHYSICAL CONDITION

BACKGROUND OF THE INVENTION

The present invention relates to condition monitoring, particularly for monitoring temperatures and pressures in environments which are not suitable for electrically operated transducers.

While it is quite common to monitor temperatures and pressures in many types of systems by means of electrically operated transducers, such as thermocouples a piezoelectric devices, there are many types of equipment in which, because the presence of high voltages, transducers of this type cannot be satisfactorily employed.

However, it has proven difficult to monitor such parameters in such environments with purely nonelectrical transducers. Optically coupled temperature transducers which have been previously proposed include: those which are constructed to sense black body emission and which can be employed only to monitor higher temperatures and require the use of expensive fibers; elements which compare the quenching of different fluorescent lines or which measure temperature dependence of decay, which require special light sources and expensive fibers; and elements which measure jacket loss and are of limited accuracy.

SUMMARY OF THE INVENTION

It is a primary object of the present invention to monitor temperatures and pressures by the use of a passive transducer which is completely nonelectrical in nature.

Another object of the invention is to produce accurate temperature and pressure measurements over a wide range of values using such a transducer.

A further object of the invention is to monitor temperature or pressure by the use of a passive transducer which is durable and reliable.

The above and other objects of the invention are achieved by a method for monitoring a physical condition, i.e. temperature or pressure, comprising:

providing a light path having an input end and an output end and a light radiation attenuating characteristic which is substantially independent of radiation wavelength, at least with respect to a given wavelength range;

conducting light radiation having first and second wavelengths which are in the given wavelength range and which differ from one another along the light path from the inlet end to the outlet end;

controlling the intensity of the radiation along the light path as a function of the temperature or pressure to be monitored and the radiation wavelength;

producing: a first signal having a value representing the intensity at the output end of the path of radiation having the first wavelength; a second signal having a value representing the intensity at the input end of the path of radiation having the first wavelength; a third signal having a value representing the intensity at the output end of the path of radiation having the second wavelength; and a fourth signal having a value representing the intensity at the input end of the path of radiation having the second wavelength; and deriving a condition signal having a value representing the ratio of the mathematical product of the values of the first and fourth signals to the mathematical product of the values of the second and third signals.

The objects according to the invention are further achieved by a physical condition-to-force transducer comprising: means defining a light conducting path; transducing means disposed in the path for causing the intensity of light conducted along the path to have a value which is a function of a mechanical force imposed on the transducing means; and mechanical input means mechanically coupled to the transducing means for imposing on the transducing means a mechanical force proportional to a physical condition of the input means.

It has been found that the present invention permits the monitoring of temperatures in a range of −40° to 120° C., with an accuracy of ±5° while being able to automatically compensate for at least 10 db changes in cable attenuation. Moreover, systems for implementing the invention can be constructed relatively inexpensively.

DESCRIPTION OF THE PREFERRED EMBODIMENTS

Figure 1:
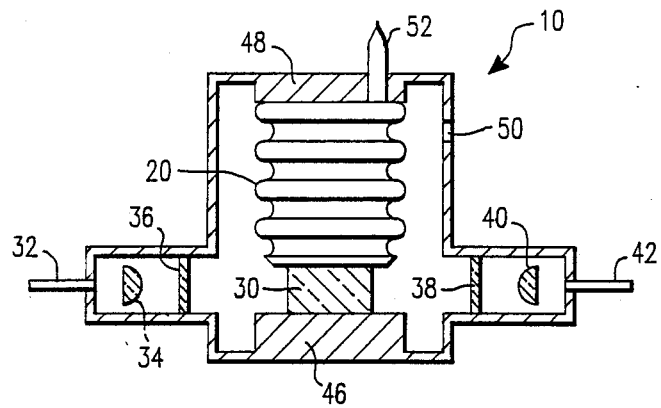
FIG. 1 is a cross-sectional view of a preferred embodiment of a transducer according to the invention.

FIG. 1 illustrates one embodiment of a sensor module which can be installed in thermal contact with a body whose temperature is to be monitored. The module includes a housing 10 containing a sealed bellows 20 filled with an inert gas, such as helium, at an initial pressure selected to cause the bellows to have the desired force vs. temperature characteristic in the temperature range to be monitored. Bellows 20 is supported on a block 30 of transparent, optically isotropic material having a composition and dimensions selected to vary the polarization of a collimated, linearly polarized, beam in such a manner that the beam polarization becomes elliptical with an axial ratio which varies as a function of the force applied to the material in a direction perpendicular to the axis of the beam. A substantially monochromatic light beam supplied via an optical fiber 32 passes through a collimating lens 34 and a first polarizer 36 which linearly polarizes the beam along a selected polarization axis transverse to the beam axis. The thus polarized beam then traverses block 30 and passes through a second polarizer 38 having a polarization axis which is either parallel or at 90° to the polarization axis of polarizer 36. Then, the beam passes through a second collimating lens 40 and reaches an output optical fiber 42. The polarization axis of each of polarizers 36 and 38 is oriented at an angle of 45° to the direction of the force applied by bellows 20 to block 30.

Housing 10, which is to be mounted in thermal contact with the body whose temperature is to be monitored, includes support portions 46 and 48 which help to maintain a fixed distance between the bottom of block 30 and the top of bellows 20 in order to assure that the force applied by bellows 22 to block 30 will be a well defined function of the pressure within bellows 20. Housing 10 is provided with at least one opening 50 to maintain the interior of housing 10 in communication with the surrounding environment and to thus assure that bellows 20 is maintained at the temperature to be monitored. Since the pressure of the gas contained within bellows 20 will vary as a function of temperature, the force applied by bellows 22 to block 30 will equally be proportional to the temperature within housing 10.

Prior to use, bellows 20 is filled with the desired gas to a selected starting pressure via fill opening 52 which is then permanently sealed.

Within the spirit of the present invention. bellows 20 could be replaced by some other element which produces a force proportional to temperature. For example, use could be made of a metal strip, for example a bimetal strip, having one end secured to housing 10 so that its free end presses against block 30 so as to apply thereto a force proportional to temperature.

In further accordance with the invention, the sensor module could be employed to monitor the pressure of a fluid by leaving fill opening 52 open and placing it in communication with a body of fluid, liquid or gaseous, whose pressure is to be monitored. Variations in the pressure of that fluid will produce a corresponding variation in the force imposed by bellows 20 on block 30. Any variation in fluid temperature will influence that force only to the extent that it influences the fluid pressure since the force applied to block 30 is, in any event, directly dependent only on the pressure within bellows 20.

As a collimated beam passes from fiber 32 to fiber 42 via lens 34, polarizer 36, block 30, polarizer 38 and lens 40, its intensity will be influenced by the optical properties of block 30 such that an electrical signal, I, representing the intensity of the light reaching fiber 42 and derived by an electrical circuit including a photodetector coupled to fiber 42 will correspond to the following equation:

$$I = (1-\alpha)I_0(1 \pm \cos(2\pi k F/(w \cdot wl)))$$

where:

the sign preceding the cosine term will depend on whether the polarization axis of polarizer 38 is parallel or at 90° to the polarization axis of polarizer 36;

$\alpha$ represents the intensity reduction due to the attenuation occurring in all of the optical components listed above and the transfer characteristic of the electrical circuit;

$I_0$ is the value of the signal produced by a comparable electrical circuit coupled to receive the light supplied to fiber 32;

k is the stress optical coefficient of the optical material;

F is the force applied by bellows 20 to block 30;

w is the width of block 30 perpendicular to both the axis of the light beam passing through block 30 and the direction of force F, i.e. perpendicular to the plane of FIG. 1; and wl is the wavelength of the polarized light.

By way of example, block 30 could be made of a glass composition known in the art as crown glass, or BK7 glass, which has a coefficient, k, of $2.74 \times 10^{-13} cm^2/dyne$.

It will be noted that the force exerted by bellows 20 on block 30 is proportional to the difference between the absolute pressure within bellows 20 and the ambient atmospheric pressure surrounding bellows 20. Thus, the accuracy of the temperature readings could be improved by introducing a correction for changes in the ambient pressure. The need for such corrections can be minimized if the bellows has a small effective cross-sectional area and is filled with gas at a high pressure. In one exemplary embodiment of the invention, use was made of a bellows having an effective cross-sectional area of the order of 6.45 cm$^2$ (lin$^2$) and was filled with helium at an absolute pressure of 180 kg/cm$^2$ (2550 psia) at 20° C.

According to the above equation, if F=0, then I=0 if the cosine term is negative, and $I = 2(1-\alpha)I_0$ if the cosine term is positive.

Since I is a function of both $\alpha$ and F (as well as wl) a simple measurement of the intensity of the light reaching a photodetector coupled to optical fiber 42 will not provide an indication of whether a change in that intensity resulted from a change in the temperature being monitored or a change in $\alpha$. According to the invention, the influence of changes in $\alpha$ is nullified by causing optical radiation having two different wavelengths to be conducted alternatingly through the optical path and mathematically combining signals representative of the values of I and $I_0$ for the two radiation wavelengths in a manner to suppress the influence of any change in $\alpha$. The two wavelengths have values such that the attenuation experienced by light passing through the optical fibers, polarizers and collimating lenses, and the responses of the associated output current amplifiers, i.e., $\alpha$, will be nearly independent of the light wavelength, i.e., the attenuation will be the same for light emitted by both diodes.

Specifically, this result can be achieved by deriving a temperature signal having a value proportional to $I_1 * I_{2o} * I_{1o}$, where 1 identifies optical radiation having a first wavelength and 2 identifies radiation having the second wavelength.

Figure 2:
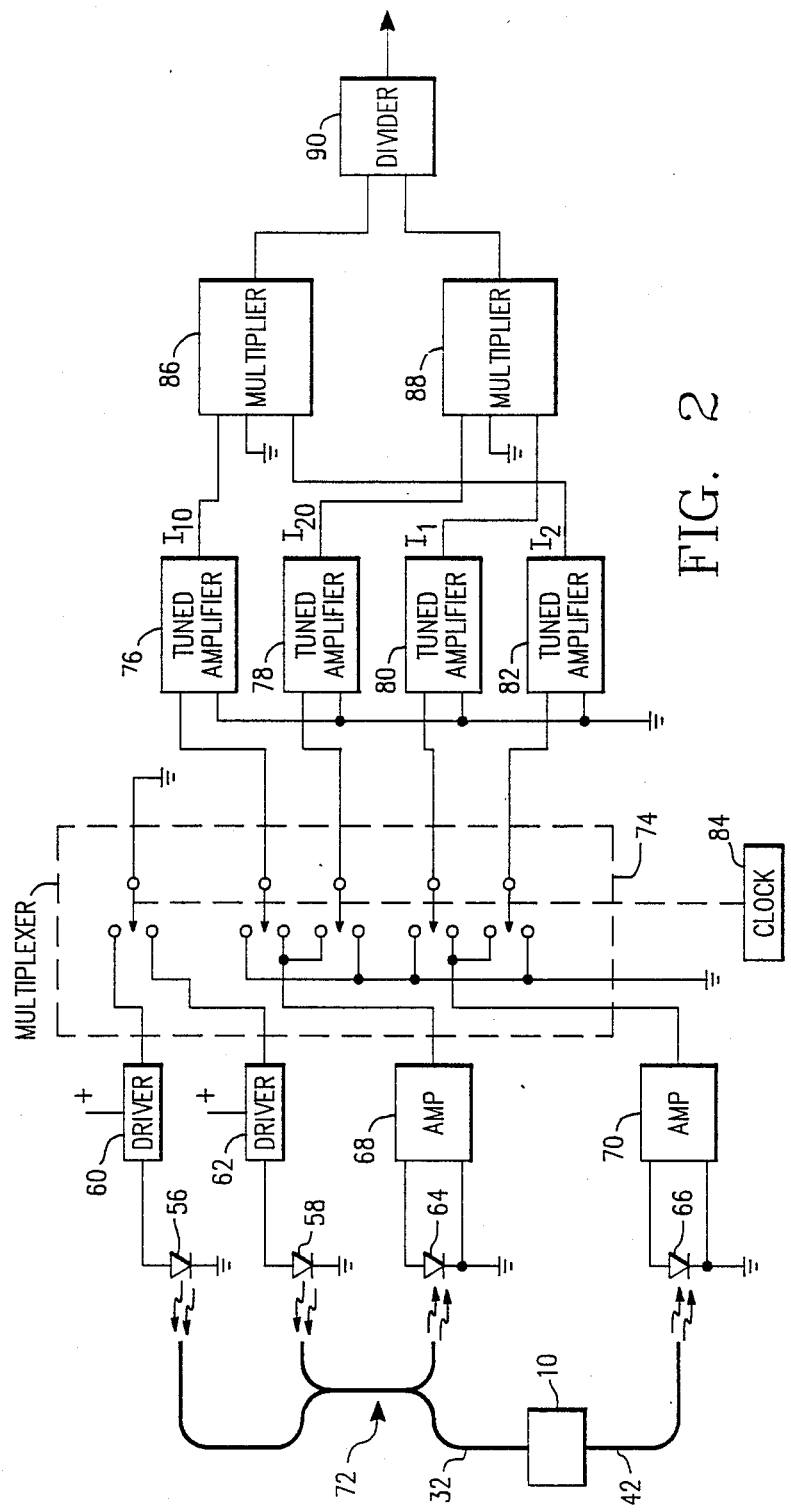
FIG. 2 is a schematic diagram of a preferred embodiment of a monitoring system operable according to a preferred embodiment of the invention.

A circuit for deriving such temperature signal is illustrated in FIG. 2. This circuit includes two LEDs, or laser diodes, 56 and 58 each selected to emit light of a respectively different wavelength wl1 and wl2 and each powered by a respective driver 60, 62, each driver being connected to an appropriate power source. Two photodetectors 64 and 66, which may be photodiodes, are each connected to a respective amplifier 68, 70, which may be transimpedance amplifiers.

A four-port optical directional coupler 72 has an input end provided with two ports each optically coupled by an associated optical fiber to a respective one of the light sources 56 and 58. Coupler 72 further has an output end provided with two ports one of which is coupled to optical fiber 32 and the other which is optically coupled, via an optical fiber if necessary, to photodetector 64. Optical fiber 42 is optically coupled to photodetector 66. Coupler 72 has the property that light arriving at either port at the input end is divided equally between the ports at the output end.

A time multiplexer 74 provides a plurality of switchable paths for effecting connections to drivers 60 and 62, and amplifiers 68 and 70. A first switchable path of multiplexer 74 selectively connects a control input of either one of drivers 60 and 62 to ground. Each driver is arranged to supply an actuating current to its associated diode when its control input is disconnected from ground.

A first pair of further switchable paths is arranged to selectively connect the output of amplifier 68 to the input of either one of two tuned amplifiers 76 and 78, while a second pair of further switchable paths of multiplexer 74 is arranged to selectively connect the output of amplifier 70 to either one of two further tuned amplifiers 80 and 82.

Multiplexer 74, which may be composed of an array of electronic switches, is controlled by a clock 84 so that, during a first half of each switching cycle, driver 60 is actuated, the output of amplifier 68 is connected to the input of amplifier 76 and the output of amplifier 70 is connected to the input of amplifier 80, while during the second half of each switching cycle driver 62 is actuated, the output of amplifier 68 is connected to the input of amplifier 78 and the output of amplifier 70 is connected to the input of amplifier 82. During the half cycle when the input of any tuned amplifier 76, 78, 80, 82 is not connected to the output of one of amplifiers 68 and 70, that tuned amplifier input is connected to ground.

Thus, the signal applied to each tuned amplifier 76, 78, 80 and 82 is composed of a square wave having an amplitude which varies between a value corresponding to the output signal from an associated one of amplifiers 68 and 70 and ground potential. Each of the tuned amplifiers is tuned to the frequency of clock 84 and thus produces an output signal having essentially a sinusoidal form and a peak amplitude value corresponding to the value of the signal at the output of the amplifier 68 or 70 to which that tuned amplifier is periodically connected.

It will appreciated from a consideration of the circuit of FIG. 2 that the amplitude of the signal from amplifier 76 corresponds to the intensity of the light signal transmitted from diode 56 to photodetector 64, the amplitude of the output signal from amplifier 78 corresponds to the intensity of the light signal transmitted from diode 58 to photodetector 64, the amplitude of the output signal from amplifier 80 corresponds to the intensity of the light signal arriving at photodetector 66 when light is being emitted by diode 56 and the amplitude of the output signal from amplifier 82 corresponds to the intensity of the light arriving at photodetector 66 when light is being emitted by diode 58. The output signals from tuned amplifiers 76 and 80 are in phase opposition to the output signals from tuned amplifiers 78 and 82.

The output signals from tuned amplifiers 76 and 82 are applied to opposite polarity inputs of a multiplier 86, while the output signals from tuned amplifiers 78 and 80 are applied to opposite polarity inputs of a multiplier 88. Each of multipliers 86 and 88 performs an amplitude multiplication of the signals applied thereto and eliminates the AC term from the resulting product by means of a low pass filter. The resulting filtered product signals are then applied to a divider 90 which produces, at its output, a DC signal having an amplitude proportional to $I_1 I_{2o}/I_2 * I_{1o}$, from which signal the effect of any change in $\alpha$ is eliminated.

According to an exemplary embodiment of the invention, in which the temperature sensing module shown in FIG. 1 was given the parameter described above, diode 56 was constituted by a laser diode model ML4405 emitting light at a nominal wavelength of 750 nm and diode 58 was a laser diode model ML3401 emitting light at a nominal wavelength of 815 nm, both diodes being manufactured by the Mitsubishi Corporation. In this embodiment, block 30 of FIG. 1 was made of BK7 glass having a width, w, of the order of 0.318 cm (0.125″).

The arrangement is relatively insensitive to changes in temperature of diodes 56 and 58. If those diodes experience a temperature variation of 30° C., corresponding to a change in emitted wavelength of the order of 10 nm, the resulting change in the amplitude of the output signal from divider 90 will correspond to a temperature error 3° C.

As an alternative to the arrangement described above, the invention could be practiced by simultaneously emitting light radiation at both wavelengths, individually monitoring the intensity of the light produced by each diode, for example by means of two photodetectors each coupled to a respective diode, separating the radiation at the output end of optical fiber 42 on the basis of wavelength and monitoring the intensity of each wavelength component with a respective photodetector-amplifier circuit. In this case, multiplexer 74 could be eliminated and amplifiers 76, 78, 80 and 82 need not be tuned. In addition, in this alternative embodiment, coupler 72 could be replaced by a three-port coupler having two input ports and a single output port.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for monitoring a physical condition comprising:
   providing a light path having an input end and an output end and a light radiation attenuating characteristic which is substantially independent of radiation wavelength, at least with respect to a given wavelength range;
   conducting light radiation having first and second wavelengths which are in the given wavelength range and which differ from one another along the light path from the inlet end to the outlet end;
   controlling the intensity of the radiation along the light path as a function of the condition to be monitored and the radiation wavelength;
   producing a first signal having a value representing the intensity at the output end of the path of radiation having the first wavelength; a second signal having a value representing the intensity at the input end of the path of radiation having the first wavelength; a third signal having a value representing the intensity at the output end of the path of radiation having the second wavelength; and a fourth signal having a value representing the intensity at the input end of the path of radiation having the second wavelength; and
   deriving a condition value signal having a value representing the ratio of the mathematical product of the values of the first and fourth signals to the mathematical product of the values of the second and third signals.

2. A method as defined in claim 1 wherein said step of controlling is carried out by generating a force which is proportional to the temperature of a fluid and causing the intensity of the radiation to have a value which is proportional to the generated force.

3. A method as defined in claim 2 wherein said step of controlling comprises effecting linear polarization of the radiation and varying the polarization as a function of the generated force.

4. A method as defined in claim 1 wherein said step of producing comprises generating electrical signals constituting the first, second, third and fourth signals.

5. A method as defined in claim 1 wherein said step of conducting is carried out by conducting light radiation having the first and second wavelengths sequentially and in time alternation.

6. A method as defined in claim 5 wherein the light radiation at each of the wavelengths is substantially monochromatic.

7. A method as defined in claim 1 wherein said step of controlling is carried out by generating a force which is proportional to the pressure of a fluid and causing the intensity of the radiation to have a value which is proportional to the generated force.

8. A system for monitoring a physical condition comprising:
   means providing a light path having an input end and an output end and a light radiation attenuating characteristic which is substantially independent of radiation wavelength, at least with respect to a given wavelength range;
   means connected for conducting light radiation having first and second wavelengths which are in the given wavelength range and which differ from one another along said light path from the inlet end to the outlet end;
   means connected for controlling the intensity of the radiation along said light path as a function of the condition to be monitored and the radiation wavelength;
   signal generating means coupled to said path for producing: a first signal having a value representing the intensity at the output end of the path of radiation having the first wavelength; a second signal having a value representing the intensity at the input end of the path of radiation having the first wavelength; a third signal having a value representing the intensity at the output end of the path of radiation having the second wavelength; and a fourth signal having a value representing the intensity at the input end of the path of radiation having the second wavelength; and
   signal processing means connected to said signal generating means for deriving a condition value signal having a value representing the ratio of the mathematical product of the values of the first and fourth signals to the mathematical product of the values of the second and third signals.

9. A transducer comprising:
   means defining a light conducting path;
   transducing means disposed in said path for causing the intensity of light conducted along said path to have a value which is a function of a mechanical force imposed on said transducing means; and
   mechanical input means mechanically coupled to said transducing means for imposing on said transducing means a mechanical force proportional to a physical condition of said input;
   wherein said means defining a light conducting path comprise two linear polarizers having polarization axes with defined angular orientations and said transducing means comprise a body interposed in the light path between said polarizers and made of a material which alters the polarization of light passing therethrough as a function of the mechanical force imposed on said body in a direction perpendicular to the direction of travel of light therethrough.

10. A transducer as defined in claim 9 wherein said mechanical input means comprise a sealed bellows filled with gas to a selected pressure at a given reference temperature.

11. A transducer as defined in claim 10 wherein said bellows is constructed to have a small cross section and is filled with gas at a high pressure.

12. A transducer as defined in claim 9 wherein said transducing means comprise a block of BK7 glass.

13. A transducer as defined in claim 9 for monitoring the pressure of a fluid wherein said mechanical input means comprise a bellows having its interior communicating with the fluid.

* * * * *